(12) United States Patent
Yan et al.

(10) Patent No.: US 8,452,192 B2
(45) Date of Patent: May 28, 2013

(54) APPARATUS AND METHOD FOR MONITORING STATISTICAL CHARACTERISTICS OF PHASE NOISES, AND COHERENT OPTICAL COMMUNICATION RECEIVER

(75) Inventors: Weizhen Yan, Beijing (CN); Zhenning Tao, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 123 days.

(21) Appl. No.: 13/058,262

(22) PCT Filed: Nov. 28, 2008

(86) PCT No.: PCT/CN2008/073245
§ 371 (c)(1),
(2), (4) Date: Aug. 1, 2011

(87) PCT Pub. No.: WO2010/060245
PCT Pub. Date: Jun. 3, 2010

(65) Prior Publication Data
US 2011/0286741 A1    Nov. 24, 2011

(51) Int. Cl.
*H04B 10/06* (2006.01)
(52) U.S. Cl.
USPC ............. 398/208; 398/202; 398/209; 398/33; 398/34; 398/25; 375/344; 375/325
(58) Field of Classification Search
USPC ................. 398/202, 204, 205, 206, 207, 208, 398/209, 210, 211, 212, 213, 214, 183, 188, 398/135, 136, 137, 139, 158, 159, 33, 34, 398/25, 26, 27; 375/344, 325, 324, 320, 327, 375/373, 294, 375, 341
See application file for complete search history.

(56) References Cited

U.S. PATENT DOCUMENTS 7,970,290 B2 * 6/2011 Tao et al. .................. 398/202
8,078,066 B2 * 12/2011 Li et al. .................... 398/209

FOREIGN PATENT DOCUMENTS
JP     2007-521729    8/2007

OTHER PUBLICATIONS
Japanese Office Action issued Dec. 4, 2012 in corresponding Japanese Patent Application No. 2011-537813.

* cited by examiner

*Primary Examiner* — Hanh Phan
(74) *Attorney, Agent, or Firm* — Staas & Halsey LLP

(57) ABSTRACT

This invention relates to an apparatus and a method for monitoring statistical characteristics of phase noises, as well as to a coherent optical communication receiver. The apparatus for monitoring statistical characteristics of phase noises comprises an argument calculating unit (203), for obtaining an argument of a signal input thereto; an unwrapping unit (204), for unwrapping the argument obtained by the argument calculating unit (203) to obtain a phase signal (205); a delaying unit (207), for delaying the phase signal; a differentiating unit (209), for obtaining a difference between a phase signal currently obtained by the unwrapping unit (204) and a phase signal delayed by the delaying unit (207); a modulus squaring unit (210), for obtaining a square of the modulus of the difference; and an averaging unit (211), for averaging squares of moduli of a plurality of differences obtained by the modulus squaring unit (210) to obtain a mean-squared differential phase (MSDP) value.

22 Claims, 5 Drawing Sheets

APPARATUS AND METHOD FOR MONITORING STATISTICAL CHARACTERISTICS OF PHASE NOISES, AND COHERENT OPTICAL COMMUNICATION RECEIVER

CROSS REFERENCE TO RELATED APPLICATIONS

This application claims the benefit under 35 U.S.C. Section 371, of PCT International Application No. PCT/CN2008/073245, filed Nov. 28, 2008, the disclosures of which are hereby incorporated by reference.

FIELD OF THE INVENTION

The present invention relates to communications, and more particularly, to estimation of phase noises in a wavelength division multiplex (WDM) optical communication system.

BACKGROUND

Cross-phase modulation (XPM) means that the signal phase in one channel is modulated by fluctuations of optical intensity of another channel. It originates from variation in refractivity of an optical fiber medium with variation in intensity of an optical field. Since there are a great number of channels in a WDM optical communication system, intensity of an optical field in the optical fiber medium randomly fluctuates, thereby applying phase noises to any channel. Such phase noises caused by cross-phase modulation are an important source leading to system cost. Because phase variation of a channel caused by cross-phase modulation is random, its characteristics are usually expressed by statistical amounts (such as autocorrelation functions). Statistical characteristics of XPM phase noises are related to many factors such as system configuration, signal power and modulation mode, and these amounts vary with topological structure, time and environment of the communication system. It appears to be very necessary to have an XPM monitoring apparatus capable of operating online, as it is conducive to such operations as compensation of phase noises, estimation of channel characteristics and optimization of the system, etc.

Currently available technologies for monitoring XPM phase noises are based on spectral measurement of signals. In "*Cross-phase modulation in fiber links with multiple optical amplifiers and dispersion compensators*" (JOURNAL OF LIGHTWAVE TECHNOLOGY, VOL. 14, NO. 3, MARCH 1996), Ting-Kuang Chiang et al. the amplitude of phase variation generated by a sine intensity modulated adjacent channel to an observation channel is measured, but the measuring method does not apply to non-sine modulated adjacent channel, so that its application is restricted. In "*Analysis and measurement of root-mean-squared bandwidth of cross-phase-modulation-induced spectral broadening*" (IEEE PHOTONICS TECHNOLOGY LETTERS, VOL. 11, NO. 9, SEPTEMBER 1999), Keang-Po Ho et al. root-mean-squared values of spectral broadening bandwidths induced by XPM phase noises are measured. However, none of the aforementioned monitoring technologies can obtain statistical characteristics of XPM-induced phase noises in real time.

SUMMARY

The present invention is proposed in view of the current status of the art to overcome one or more defects existed in prior art and to provide at least one advantageous option.

In order to achieve the above objective, the present application provides the following aspects.

Aspect 1: an apparatus for monitoring statistical characteristics of phase noises, comprising:
an argument calculating unit, for obtaining an argument of a signal input thereto;
an unwrapping unit, for unwrapping the argument obtained by the argument calculating unit to obtain a phase signal;
a delaying unit, for delaying the phase signal;
a differentiating unit, for obtaining a difference between a phase signal currently obtained by the unwrapping unit and a phase signal delayed by the delaying unit;
a modulus squaring unit, for obtaining a square of the modulus of the difference; and
an averaging unit, for averaging squares of moduli of a plurality of differences obtained by the modulus squaring unit to obtain a mean-squared differential phase (MSDP) value.

Aspect 2: the apparatus for monitoring statistical characteristics of phase noises according to Aspect 1, characterized in further comprising:
an MSDP value sequence obtaining unit, for obtaining an MSDP value sequence by changing a delaying amount of the delaying unit such that the averaging unit may obtain different MSDP values; and
an autocorrelation sequence obtaining unit, for obtaining an autocorrelation sequence of phase noises in accordance with the MSDP sequence.

Aspect 3: the apparatus for monitoring statistical characteristics of phase noise according to Aspect 2, characterized in further comprising:
a laser line width influence suppressing unit, for measuring a value of a laser line width and suppressing an influence of the laser line width in the MSDP value sequence.

Aspect 4: the apparatus for monitoring statistical characteristics of phase noises according to Aspect 2, characterized in further comprising:
an amplifier spontaneous radiation noise influence suppressing unit, for measuring a value of an amplifier spontaneous radiation noise and suppressing an influence of the amplifier spontaneous radiation noise in the MSDP value sequence.

Aspect 5: the apparatus for monitoring statistical characteristics of phase noises according to Aspect 1, characterized in further comprising:
a conjugating unit, for obtaining a conjugate of a first input signal;
an multiplier, for obtaining a product of a second signal with the conjugate of the first input signal obtained by the conjugating unit;
wherein the argument calculating unit obtains the argument of the product input thereto.

Aspect 6: the apparatus for monitoring statistical characteristics of phase noises according to Aspect 5, characterized in that the first input signal is a data output from a data recovering unit of a digital coherent optical communication receiver, and the second signal is an electric signal from a front end processor of the digital coherent optical communication receiver.

Aspect 7: the apparatus for monitoring statistical characteristics of phase noises according to any one of Aspects 1-6, characterized in further comprising a phase error removing unit, for removing a phase error in the phase signal obtained by the unwrapping unit.

Aspect 8: the apparatus for monitoring statistical characteristics of phase noises according to Aspect 7, characterized in that the phase error removing unit removes a phase error caused by an frequency offset from an frequency offset estimating means of the digital coherent optical communication receiver by subtracting, from the phase signal obtained by the unwrapping unit (204), the phase error.

Aspect 9: a digital coherent optical communication receiver, characterized in comprising the apparatus for monitoring statistical characteristics of phase noises according to any one of Aspects 1-8.

Aspect 10: a method for monitoring statistical characteristics of phase noises, comprising:

an argument calculating step, for obtaining an argument of an input signal;

an unwrapping step, for unwrapping the argument obtained in the argument calculating step to obtain a phase signal;

a delaying step, for delaying the phase signal;

a differentiating step, for obtaining a difference between a phase signal currently obtained in the unwrapping step and a phase signal delayed in the delaying step;

a modulus squaring step, for obtaining a square of the modulus of the difference; and an averaging step, for averaging squares of moduli of a plurality of differences obtained in the modulus squaring step to obtain an MSDP value.

Aspect 11: a computer executable software, comprising a command that, when executed by a computer or other logical components, enables the computer or the other logical components to realize each of the steps in the above method.

"Executable" in this context includes execution performed after the command having been explained or compiled.

Aspect 12: a computer readable storage medium, storing the computer software according to Aspect 11. The computer readable storage medium can for instance be a CD, a DVD, a floppy disk, a magnetic tape, a hard disk driver, a flash memory, an ROM, and an RAM etc.

With reference to the subsequent description and drawings, these and other aspects and features of the present invention will become more apparent. In the description and accompanying drawings, specific embodiments of the present invention are disclosed in detail, and modes of execution employable by the principles of the present invention are pointed out. As should be understood, the scope of the present invention is not restricted thereby. The present invention includes many variations, modifications and equivalents within the scope of the principles in the claims as attached.

Features described and/or illustrated with regard to one embodiment can be applied to one or more embodiments in an identical or similar manner, be combined with features of other embodiments, or replace features of other embodiments.

As should be stressed, terms "comprising/including" when used in the present documents indicate existence of features, integers, steps or components, but do not exclude the existence or addition of one or more other features, integers, steps or components.

The variety of aspects of the present invention can be better comprehended with reference to the following accompanying drawings. Component parts in the drawings are not drawn in proportion, but are merely directed to showing the principles of the present invention. To facilitate illustrating and describing certain portions of the present invention, corresponding sections in the drawings may be amplified, i.e. enlarged relative to other component parts in an exemplary device actually fabricated according to the present invention. Elements and features described in one figure or one embodiment can be combined with elements and features described in one or more other figures or embodiments in the present invention. In addition, similar reference numerals in the drawings indicate corresponding component parts in several figures, and can also be used to indicate more than one corresponding component parts employed in the embodiments.

BRIEF DESCRIPTION OF THE DRAWINGS

The drawings illustrate preferred embodiments according to the present invention, and constitute a part of the Description to further enunciate the principles, features and advantages of the present invention together with the written description. In the drawings.

DETAILED DESCRIPTION OF PREFERRED EMBODIMENTS

Specific embodiments of the present invention are described below with reference to the accompanying drawings. In the descriptions of the embodiments of the present invention, the apparatus and method for monitoring statistical characteristics of phase noises are applied in a digital coherent receiver. But this is not restrictive, as the apparatus and method for monitoring statistical characteristics of phase noises according to the present invention can also be applied in other systems, for instance, in an online performance appraising system in an optical communication link.

In the case of application in a digital coherent receiver, the present invention obtains, with a digital signal processing method, from received signal samples statistical characteristics of phase noises, namely an autocorrelation sequence of phase noises, induced by cross-phase modulation.

Figure 1:
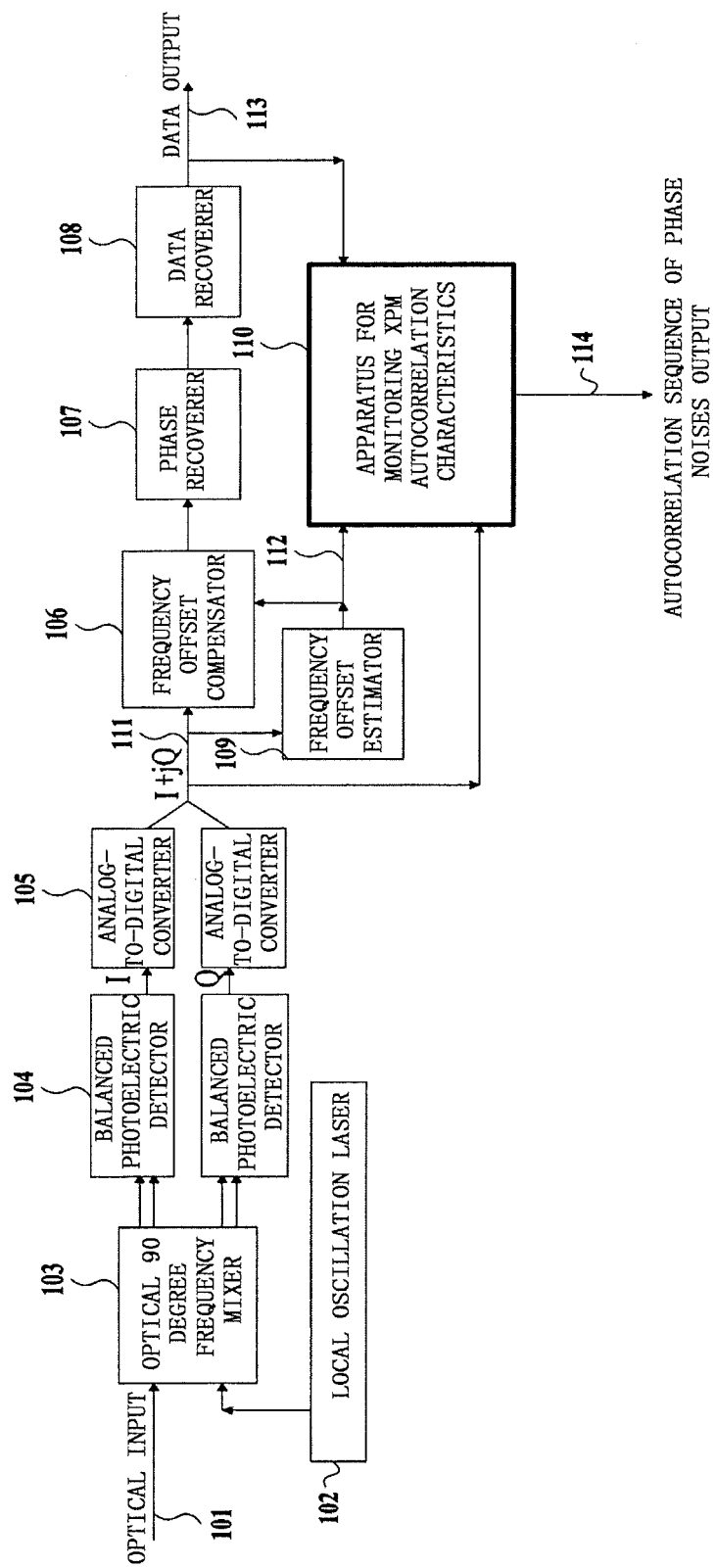
FIG. 1 illustrates a digital optical coherent communication receiver as well as the location of an apparatus for monitoring XPM autocorrelation characteristics therein according to one embodiment of the present invention.

FIG. 1 illustrates a typical digital optical coherent communication receiver as well as the location of an apparatus for monitoring XPM autocorrelation characteristics therein. As shown in FIG. 1, the digital optical coherent communication receiver comprises a local oscillation laser 102, an optical 90 degree frequency mixer 103, a balanced photoelectric detector 104 and an analog-to-digital converter (ADC) 105; these component parts form the front end processing section of the coherent receiver. The front end processing section changes an optical signal 101 into a baseband digital electric signal (I+jQ) 111, wherein I is a cophase component and Q is a quadrature component. In addition, the digital optical coherent communication receiver further comprises a frequency offset compensator 106, a phase recoverer 107, a data recoverer 108 and a frequency offset estimator 109. After digital signal processing by the frequency offset compensator 106, the phase recoverer 107 and the data recoverer 108, the baseband digital electric signal 111 forms data output 113 (also referred to as data 113).

The frequency offset estimator 109 estimates the value of frequency offset in accordance with the baseband digital electric signal 111, and outputs a phase error value 112 caused by the frequency offset. The position of the frequency offset estimator 109 or its connection relationship with other component parts is variable. See the following documents for the specific operating method of the digital receiver: Chinese Patent Application, "Optical Coherent Receiver, Frequency Offset Estimating Apparatus and Method for Use in Optical Coherent Receiver" (Inventors: Lei L I et al., Application No. 200710166788.3), Chinese Patent Application, "Frequency Offset Compensating Apparatus and Method, Optical Coherent Receiver" (Inventors: Lei L I et al., Application No. 200710196347.8), and Chinese Patent Application, "Phase Offset Estimator, Coherent Receiver and Phase Offset Estimating Method" (Inventors: Zhenning T A O et al., Application No. 200710188795.3). The above component parts can to all be realized by means of conventional component parts and conventional methods. Different from the conventional digital optical coherent communication receiver, the digital optical coherent communication receiver according to the present invention further comprises an apparatus 110 for monitoring XPM autocorrelation characteristics. Input signals of the apparatus 110 for monitoring XPM autocorrelation characteristics are the baseband digital electric signal 111, the phase error value 112 caused by frequency offset, and data 113, while output signal thereof is the autocorrelation sequence 114 of XPM-induced phase noises.

While working based on analysis of mean-squared differential phase (MSDP) values, the apparatus 110 for monitoring XPM autocorrelation characteristics is mainly composed of two sections, namely an MSDP measuring section and an MSDP processing section. As should be noted, although the MSDP processing section operates based on and in connection with the MSDP measuring section, these two sections can be fabricated into individual products, respectively. The apparatus 110 for monitoring XPM autocorrelation characteristics may be only the MSDP measuring section. These two sections are respectively described in the following.

Figure 2:
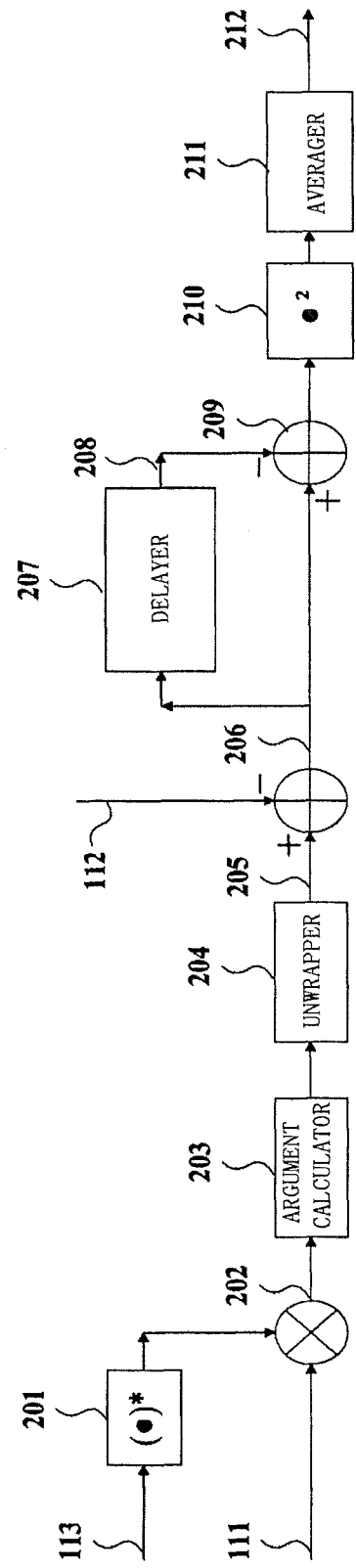
FIG. 2 is a block diagram illustrating the MSDP measuring section of the apparatus for monitoring XPM autocorrelation characteristics according to one embodiment of the present invention.

FIG. 2 is a block diagram illustrating the MSDP measuring section of the apparatus 110 for monitoring XPM autocorrelation characteristics according to one embodiment. As shown in FIG. 2, the conjugate of data 113 is firstly calculated at the module 201, the conjugate of data 113 is subsequently multiplied with the baseband digital electric signal 111 to obtain a digital electric signal 202 with data having been removed. The digital electric signal 202 is then input into an argument calculator 203. Of course, if the baseband digital electric signal 111 is a special signal without modulation information (for instance, in the case that an optical signal emitted from a transmitter is a continuous optical CW signal not being modulated), it can be directly input into the argument calculator 203. An argument calculation is performed on the complex signal of the digital electric signal 202 at the argument calculator 203. An unwrapper 204 then performs unwrapping operation on the argument obtained by the argument calculator 203. The numerical value obtained by the argument calculator 203 falls within the range of $[0, 2\pi]$, and function of the unwrapping operation is to expand the numerical value obtained by the argument calculator to the range of $[-\infty, +\infty]$.

Any known phase unwrapping method can be employed here, such as the unwrap function in MATLAB. Subsequently, the phase error 112 caused by the frequency offset is subtracted (of course, if the frequency offset is relatively small, this step can be omitted) to obtain a phase signal 206, which can be expressed as $\phi_{XPM,i}+\phi_{LW,i}+\phi_{n,i}$, where $\phi_{XPM}$ is phase shift caused by XPM, $\phi_{LW}$ is phase shift caused by laser line width, $\phi_n$ is phase shift caused by amplifier spontaneous radiation noises, and subscript i indicates time sequence of a discrete-time sample signal. In one embodiment of the present invention, the phase signal 206 is firstly delayed by N symbols (N is an integer greater than or equal to 1) at a delayer 207 to obtain a phase signal 208, which can be expressed as $\phi_{XPM,i+N}+\phi_{LW,i+N}+\phi_{n,i+N}$. Subsequently, the difference between the phase signal 206 and the delayed phase signal 208 is obtained at a subtracter 209. Thereafter, at a modulus squaring unit 210 the square of the modulus of the differential signal is calculated, and the square of the modulus is averaged at an averager 211.

What is obtained at the averager 211 is an MSDP value 212 that corresponds to the number of delayed symbols N, and it can be expressed as $$\begin{aligned}
MSDP(N) &= E\,|\,(\varphi_{XPM,i}+\varphi_{LW,i}+\varphi_{n,i}) - \\
&\qquad (\varphi_{XPM,i+N}+\varphi_{LW,i+N}+\varphi_{n,i+N})\,|^2 \\
&= E\,|\,\varphi_{XPM,i}-\varphi_{XPM,i+N}\,|^2 + E\,|\,\varphi_{LW,i}-\varphi_{LW,i+N}\,|^2 + \\
&\qquad E\,|\,\varphi_{n,i}-\varphi_{n,i+N}\,|^2 + \\
&\qquad 2E[(\varphi_{XPM,i}-\varphi_{XPM,i+N})(\varphi_{LW,i}-\varphi_{LW,i+N})] + \\
&\qquad 2E[(\varphi_{XPM,i}-\varphi_{XPM,i+N})(\varphi_{n,i}-\varphi_{n,i+N})] + \\
&\qquad 2E[(\varphi_{LW,i}-\varphi_{LW,i+N})(\varphi_{n,i}-\varphi_{n,i+N})] \\
&= |\,\varphi_{XPM,i}-\varphi_{XPM,i+N}\,|^2 + E\,|\,\varphi_{LW,i}-\varphi_{LW,i+N}\,|^2 + \\
&\qquad E\,|\,\varphi_{n,i}-\varphi_{n,i+N}\,|^2 \\
&= E\,|\,\varphi_{XPM,i}\,|^2 + E\,|\,\varphi_{XPM,i+N}\,|^2 \\
&\qquad -2E(\varphi_{XPM,i}\cdot\varphi_{XPM,i+N}) + E\,|\,\varphi_{LW,i}-\varphi_{LW,i+N}\,|^2 + \\
&\qquad E\,|\,\varphi_{n,i}\,|^2 + E\,|\,\varphi_{n,i+N}\,|^2 - 2E(\varphi_{n,i}\cdot\varphi_{n,i+N}) \\
&= \begin{cases} 0 & (N=0) \\ 2E\,|\,\varphi_{XPM,i}\,|^2 - 2E(\varphi_{XPM,i}\cdot\varphi_{XPM,i+N}) + \\ \quad E\,|\,\varphi_{LW,i}-\varphi_{LW,i+N}\,|^2 + 2E\,|\,\varphi_{n,i}\,|^2 \\ & (N \neq 0) \end{cases}
\end{aligned} \qquad (1)$$

The following information is used in the deriving process of Equation 1: $\phi_{XPM}$, $\phi_{LW}$, $\phi_n$ are independent of one another, and $E(\phi_{LW,i}-\phi_{LW,i+N})=0$, $E(\phi_{n,i}-\phi_{n,i+N})=0$; $\phi_{XPM}$ and $\phi_n$ are stationary random processes with $E|\phi_{XPM,i}|^2=E|\phi_{XPM,i+N}|^2$, $E|\phi_{n,i}|^2=E|\phi_{n,i+N}|^2$; $\phi_{n,i}$ and $\phi_{n,i+N}$ are zero-mean independently and identically distributed, so that $E(\phi_{n,i}\cdot\phi_{n,i+N})=0$.

Figure 3:
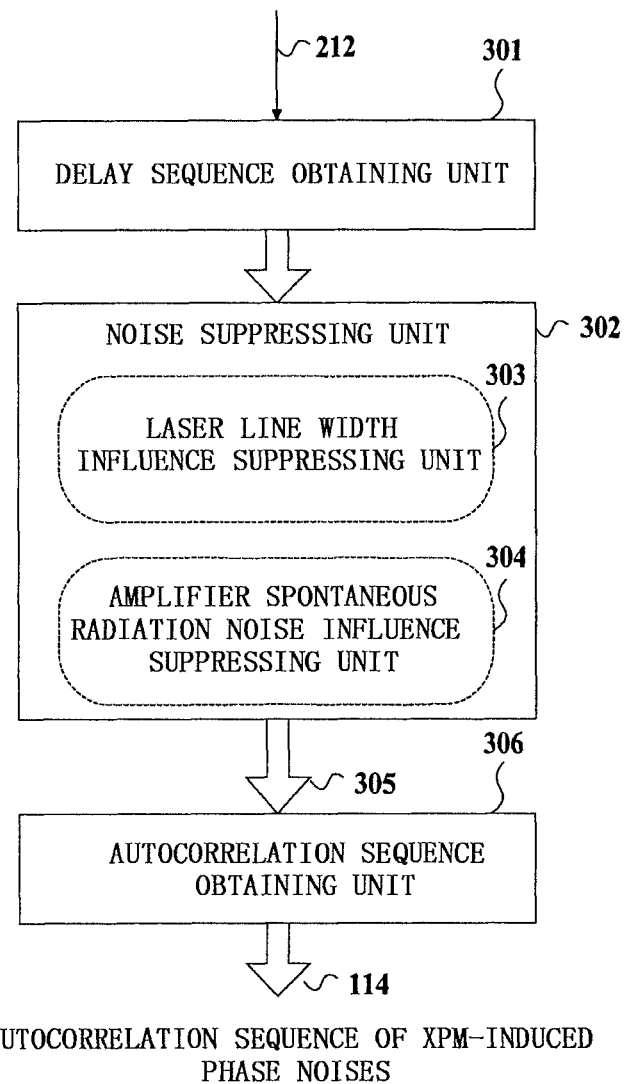
FIG. 3 is a block diagram illustrating the MSDP processing section of the apparatus for monitoring XPM autocorrelation characteristics according to one embodiment of the present invention.

FIG. 3 is a specific block diagram illustrating the MSDP processing section of the apparatus 110 for monitoring XPM autocorrelation characteristics according to one embodiment of the present invention. Input signal 212 is the MSDP value of the output signal in FIG. 2. A corresponding MSDP value can be obtained for each constant delay N. A corresponding MSDP sequence is obtained by changing the number of delayed symbols N, for instance, N=1, 2, 3 ... in sequence. As should be noted, change in the number of delayed symbols N is not restricted to the method of change in sequence, whereas it is also possible to get N=2, 4, 6 ... for instance, as long as this is obtained in equal interval. However, equal interval acquisition with interval greater than 1 is equivalent to lowering the sampling rate of the analog-to-digital converter, and this increases the time interval of the autocorrelation sequence output from the apparatus for monitoring XPM autocorrelation characteristics, and decreases statistical information amount. The MSDP sequence is obtained by a delay sequence obtaining unit 301. The delay sequence obtaining unit 301 can for instance be formed of a memory and a delaying amount changing unit. The delaying amount changing unit changes the value of the delaying amount N, while the memory sequentially stores the MSDP value obtained with regard to different values of N. The delay sequence obtaining unit 301 is also referred to as an MSDP sequence obtaining unit. Subsequently, according to one embodiment of the present invention, a noise suppressing unit 302 performs noise suppressing process on the MSDP sequence. As should be noted, when it is possible to determine in advance that phase shift caused by laser line width and phase shift caused by amplifier spontaneous radiation noises are relatively small, the noise suppressing unit 302 can be omitted.

As should be noted, the delay sequence obtaining unit 301 is drawn as an independent unit in the MSDP processing section for the sake of illustration, but it can also be incorporated into the noise suppressing unit 302. In the case the noise suppressing unit 302 is not used, it can be incorporated into an autocorrelation sequence obtaining unit 306. In addition, it can also be incorporated into the MSDP obtaining section as described above.

As indicated in Equation (1), the MSDP sequence includes information of XPM effect, laser line width and amplifier spontaneous radiation noises, and these information can be used to calculate the values of the laser line width and amplifier spontaneous radiation noises to remove their influences, so as to obtain characteristics of the XPM effect.

The noise suppressing unit 302 may include one or both of a laser line width influence suppressing unit 303 and an amplifier spontaneous radiation noise influence suppressing unit 304. When the two are both used, their operations are not differentiated as to precedence. However, to facilitate illustration, it is assumed that the operation of the laser line width influence suppressing unit 303 be performed first.

Processing principle in the laser line width influence suppressing unit 303 is as follows:
when N is relatively large, $\phi_{XPM,i}$ and $\phi_{XPM,i+N}$ are independent of one another, and $E(\phi_{XPM,i})=E(\phi_{XPM,i+N})$, so that MSDP can be expressed as $$MSDP(N) = 2E|\varphi_{XPM,i}|^2 - 2E(\varphi_{XPM,i} \cdot \varphi_{XPM,i+N}) + \qquad (2)$$
$$E|\varphi_{LW,i} - \varphi_{LW,i+N}|^2 + 2E|\varphi_{n,i}|^2$$
$$= 2E|\varphi_{XPM,i}|^2 - 2E^2(\varphi_{XPM,i}) + 2E|\varphi_{n,i}|^2 +$$
$$E|\varphi_{LW,i} - \varphi_{LW,i+N}|^2$$
$$= C + E|\varphi_{LW,i} - \varphi_{LW,i+N}|^2$$
$$= C + N \times 2\pi \Delta f \Delta T$$

where $E|\phi_{XPM,i}|^2 - 2E^2(\phi_{XPM,i}) + 2E|\phi_{n,i}|^2$ is irrelevant to N, and can hence be expressed as constant C, $\Delta f$ is laser line width, $\Delta T$ is a period of sampling time, both of which are also constants; Equation $E|\phi_{LW,i} - \phi_{LW,i+N}|^2 = N \times 2\pi \Delta f \Delta T$ shows characteristics of the laser line width (see the document by Gilad Goldfarb et al., "BER estimation of QPSK homodyne detection with carrier phase estimation using digital signal processing" (Optics Express, Vol. 14, Issue 18, pp. 8043-8053, September 2006)). Therefore, when N is relatively large, MSDP has a linear relationship with regard to N. The value of $2\pi\Delta f\Delta T$ can be obtained by calculating the slope of MSDP with regard to N. Since $\Delta T$ is hardware setting of a known analog-to-digital converter, it is possible to calculate the value of $\Delta f$. This step completes measurement of the value of the laser line width. It is possible to remove the influence of line width on MSDP through Equation (3):

$$MSDP\_303(N) = MSDP(N) - N \times 2\pi\Delta f\Delta T \qquad (3)$$

The aforementioned valuation condition that "N" is "larger" varies in a practical WDM optical communication system, depending on system parameters (such as modulation rate, modulation mode, channel interval, and chromatic dispersion management, etc.). It is possible in the present invention to judge whether N is relatively large by observing in emulation the curve of MSDP in the MSDP sequence 301 with regard to N. If the value of N is M at the time that the MSDP curve is beginning to be a straight line or approximately a straight line, any number of delayed symbols N that satisfies $\geq M$ is satisfying the "larger" N valuation condition. A larger value of N can also be empirically determined.

Processing principle of the amplifier spontaneous radiation noise influence suppressing unit 304 is as follows:
Assume $\phi_{XPM}$ and $\phi_{LW}$ are approximately equal to one another within an adjacent sampling period, namely $\phi_{XPM,i} \approx \phi_{XPM,i+1}$, $\phi_{LW,i} \approx \phi_{LW,i+1}$. Therefore, the value of amplifier spontaneous radiation noises can be obtained through MSDP(N=1):

$$MSDP(N = 1) = 2E\varphi_{XPM,i}|^2 - 2E(\varphi_{XPM,i} \cdot \varphi_{XPM,i+1}) + \qquad (4)$$
$$E|\varphi_{LW,i} - \varphi_{LW,i+1}|^2 + 2E|\varphi_{n,i}|^2$$
$$\approx 2E|\varphi_{n,i}|^2$$

where $E|\phi_{n,i}|^2$ is the statistical amount for appraising the value of amplifier spontaneous radiation noises, and this step hence completes measurement of the value of amplifier spontaneous radiation noises. The influence of amplifier spontaneous radiation noises on MSDP can be removed through Equation (5)

$$MSDP\_304(N) = MSDP(N) - 2E|\phi_{n,i}|^2 (N \neq 0) \qquad (5)$$

After noise suppression through the noise suppressing unit 302 or in the case these noises are relatively small, the MSDP signal can be expressed as a signal 305, namely:

$$MSDP\_305(N) = MSDP(N) - E|\varphi_{LW,i} - \varphi_{LW,i+N}|^2 - \qquad (6)$$
$$2E|\varphi_{n,i}|^2$$
$$= 2E|\varphi_{XPM,i}|^2 - 2E(\varphi_{XPM,i} \cdot \varphi_{XPM,i+N})$$

The MSDP sequence formed of the signal 305 only includes phase shift information induced by XPM effect, so that it can be directly converted into an autocorrelation sequence by the autocorrelation sequence obtaining unit 306.

The calculation process of the autocorrelation sequence obtaining unit 306 is as follows:
When N is relatively larger ($N \geq M$), $\phi_{XPM,i}$ and $\phi_{XPM,i+N}$ are independent of one another, and $E(\phi_{XPM,i})=E(\phi_{XPM,i+N})$, so MSDP is a constant, as shown in Equation (7):

$$MSDP\_305(\text{large } N) = 2E|\varphi_{XPM,i}|^2 - 2E(\varphi_{XPM,i} \cdot \varphi_{XPM,i+N}) \qquad (7)$$
$$= 2E|\varphi_{XPM,i}|^2 - 2E(\varphi_{XPM,i}) \cdot$$

-continued $$E(\varphi_{XPM,i+N})$$
$$= 2E|\varphi_{XPM,i}|^2 - 2E(\varphi_{XPM,i})$$
$$= C\_306$$

Constant C_306 can be determined in operation by observing the curve of MSDP with regard to N.

When N≧M, the value of MSDP remains unchanged, and this value is precisely C_306. Like the larger value of N, C_306 can also be obtained empirically or through emulation in advance.

With Equations (6) and (7), the autocorrelation sequence can be written as $$R_{xx}[\varphi_{XPM} - E(\varphi_{XPM})] = E(\varphi_{XPM,i} \cdot \varphi_{XPM,i+N}) - E^2(\varphi_{XPM,i}) \quad (8)$$
$$= (E|\varphi_{XPM,i}|^2 - E^2(\varphi_{XPM,i})) -$$
$$(E|\varphi_{XPM,i}|^2 - E(\varphi_{XPM,i} \cdot \varphi_{XPM,i+N}))$$
$$= \frac{C\_306 - MSDP\_305(N)}{2}$$

So an autocorrelation sequence 114 of XPM-induced phase noises is obtained by calculating Equation (8).

The autocorrelation sequence 114 can be provided to an operator, a phase noise compensating module, a channel characteristics appraising module or a system optimizing module to appraise and optimize the system, to compensate phase noises, and so on.

Figure 4:
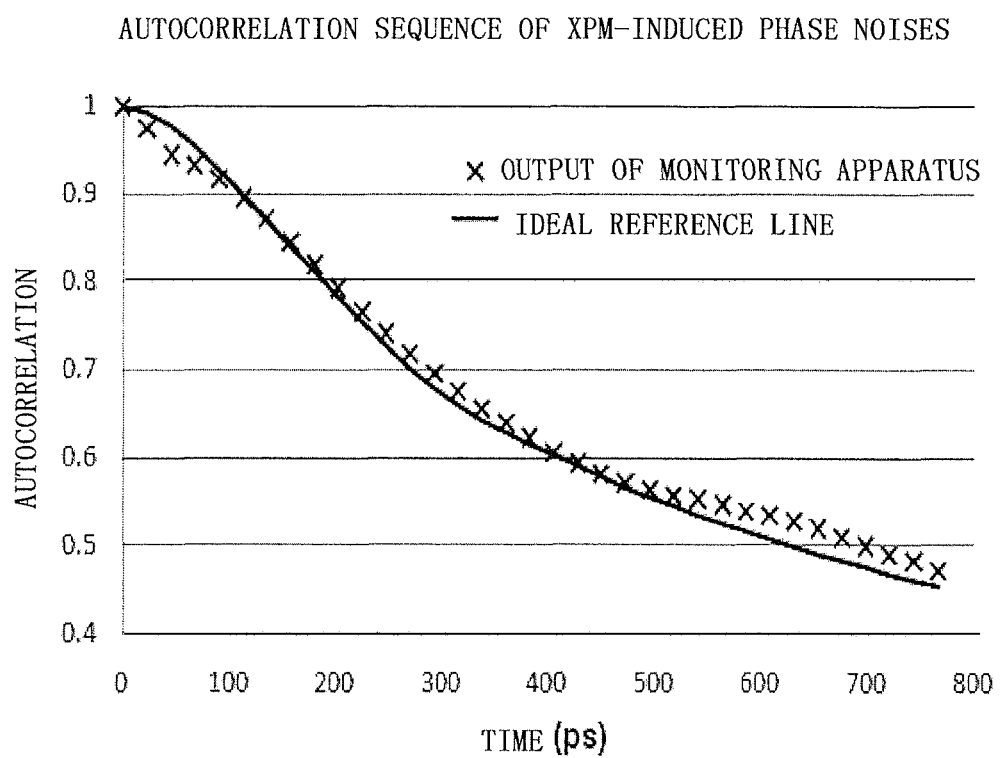
FIG. 4 provides a comparison between an autocorrelation sequence of XPM-induced phase noises obtained by the monitoring apparatus according to the present invention and an ideal reference curve.

FIG. 4 shows a comparison between an ideal reference curve and an autocorrelation sequence of XPM-induced phase noises obtained by the monitoring apparatus according to the present invention in a typical WDM optical communication system. As can be seen from this figure, output of the claimed apparatus matches excellently to the theoretical result.

Figure 5:
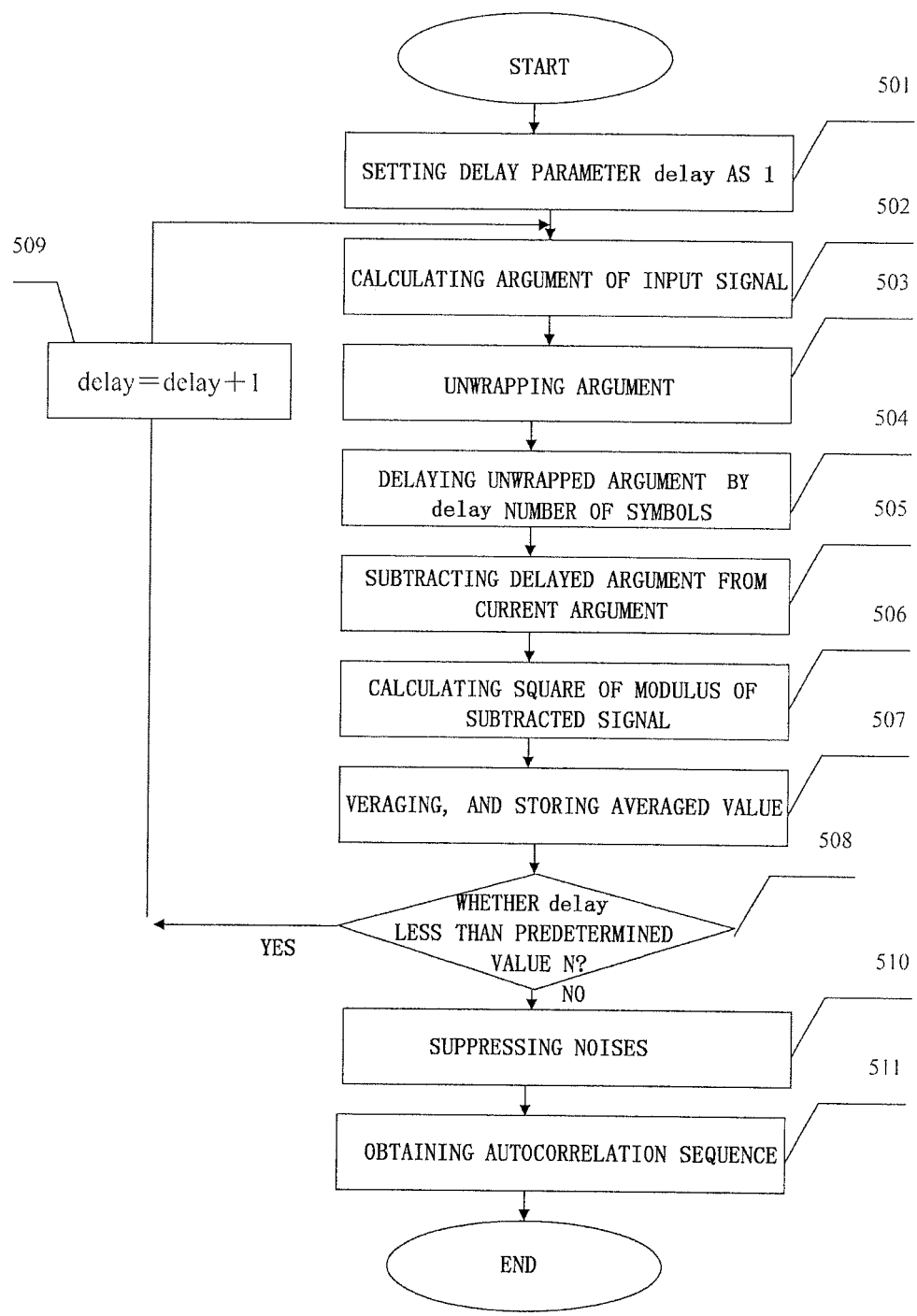
FIG. 5 is a flowchart illustrating a method for monitoring XPM autocorrelation characteristics according to one embodiment of the present invention.

FIG. 5 is a flowchart illustrating a method for monitoring XPM autocorrelation characteristics according to one embodiment of the present invention. As shown in FIG. 5, in the method for monitoring XPM autocorrelation characteristics according to one embodiment of the present invention, delay parameter delay is firstly set as 1 in Step 501, and the argument of the input signal is subsequently calculated in Step 502. As previously mentioned, the input signal is for instance the baseband digital electric signal 111 or a product between the conjugate of data 113 and the baseband digital electric signal 111. Then in Step 503, the argument obtained in Step 502 is unwrapped, i.e., the numerical value calculated by the argument calculator is expanded to the range of [−∞, +∞]. Subsequently, though not shown, when the frequency offset is relatively large, phase error caused by the frequency offset is compensated by using frequency offset information input from an external frequency offset estimator. If it is predicted or determined empirically that the frequency offset is relatively small, this step is omitted. Then in Step 504 the unwrapped argument is delayed by delay number of symbols, and the delayed argument is subtracted from the current argument in Step 505. That is to say, the argument of the previous delay number of symbol is subtracted from the argument of the current symbol to obtain a phase signal. The square of the modulus of this phase signal is obtained in Step 506. In Step 507, values of the squares of a plurality of moduli obtained with regard to the current delay are averaged, and the averaged value is stored.

It is determined in Step 508 whether the current delay value is less than a predetermined value, for instance a certain integer N. If the current delay value is less than the predetermined value N (Yes in Step 508), progress enters Step 509, in which the delay value is increased. In the present embodiment, the delay value is increased by 1. As previously mentioned, the delay value can be increased by numerical values other than 1, such as 2, 3 and so on. Then Steps 502 to 508 are repeated.

When the current delay value is not less than the predetermined value N (No in Step 508), noises are suppressed in Step 510. Such noise suppression is directed to the sequence (also referred to as delay sequence) formed by the averaged value of the squares of the moduli of phase signals obtained with regard to different delay values stored in Step 507. Noise suppression includes one or both of laser line width influence suppression and amplifier spontaneous radiation noise influence suppression. When the two are both used, their operations are not differentiated as to precedence.

Finally in Step 511, an XPM autocorrelation sequence is obtained in accordance with the noised-suppressed delay sequence.

It is possible by means of the apparatus and method for monitoring statistical characteristics of phase noises according to the present invention to obtain the autocorrelation sequence of XPM-induced phase noises, and to measure the values of laser line width and amplifier spontaneous radiation noises, so as to facilitate compensation of phase noises, appraisal of channel characteristics, and optimization of the system.

Specific embodiments of the present invention are described above. However, as should be apparent to persons ordinarily skilled in the art, it is possible to make various variations, modifications and substitutions to the present invention. Therefore, all variations, modifications and substitutions falling within the spirit and scope of the claims of the present invention shall be explained as under the protection scope of the present invention.

The invention claimed is:

1. An apparatus for monitoring statistical characteristics of phase noises, comprising:
    an argument calculating unit, for obtaining an argument of a signal input thereto;
    an unwrapping unit, for unwrapping the argument obtained by the argument calculating unit to obtain a phase signal;
    a delaying unit, for delaying the phase signal;
    a differentiating unit, for obtaining a difference between a phase signal currently obtained by the unwrapping unit and a phase signal delayed by the delaying unit;
    a modulus squaring unit, for obtaining a square of the modulus of the difference; and
    an averaging unit, for averaging squares of moduli of a plurality of differences obtained by the modulus squaring unit to obtain a mean-squared differential phase (MSDP) value.

2. The apparatus for monitoring statistical characteristics of phase noises according to claim 1, characterized in further comprising:
    an MSDP value sequence obtaining unit, for obtaining an MSDP value sequence by changing a delaying amount of the delaying unit such that the averaging unit may obtain different MSDP values; and
    an autocorrelation sequence obtaining unit for obtaining an autocorrelation sequence of phase noises in accordance with the MSDP sequence.

3. The apparatus for monitoring statistical characteristics of phase noises according to claim 2, characterized in further comprising:
a laser line width influence suppressing unit, for measuring a value of a laser line width and suppressing an influence of the laser line width in the MSDP value sequence.

4. The apparatus for monitoring statistical characteristics of phase noises according to claim 3, characterized in further comprising a phase error removing unit, for removing a phase error in the phase signal obtained by the unwrapping unit.

5. A digital coherent optical communication receiver, characterized in comprising the apparatus for monitoring statistical characteristics of phase noises according to claim 3.

6. The apparatus for monitoring statistical characteristics of phase noises according to claim 2, characterized in further comprising:
an amplifier spontaneous radiation noise influence suppressing unit, for measuring a value of an amplifier spontaneous radiation noise and suppressing an influence of the amplifier spontaneous radiation noise in the MSDP value sequence.

7. The apparatus for monitoring statistical characteristics of phase noises according to claim 6, characterized in further comprising a phase error removing unit, for removing a phase error in the phase signal obtained by the unwrapping unit.

8. A digital coherent optical communication receiver, characterized in comprising the apparatus for monitoring statistical characteristics of phase noises according to claim 6.

9. The apparatus for monitoring statistical characteristics of phase noises according to claim 2, characterized in further comprising a phase error removing unit, for removing a phase error in the phase signal obtained by the unwrapping unit.

10. A digital coherent optical communication receiver, characterized in comprising the apparatus for monitoring statistical characteristics of phase noises according to claim 2.

11. The apparatus for monitoring statistical characteristics of phase noises according to claim 1, characterized in further comprising:
a conjugating unit, for obtaining a conjugate of a first input signal;
an multiplier, for obtaining a product of a second signal with the conjugate of the first input signal obtained by the conjugating unit;
wherein the argument calculating unit obtains the argument of the product input thereto.

12. The apparatus for monitoring statistical characteristics of phase noises according to claim 11, characterized in that the first input signal is a data output from a data recovering unit of a digital coherent optical communication receiver, and the second signal is an electric signal from a front end processor of the digital coherent optical communication receiver.

13. The apparatus for monitoring statistical characteristics of phase noises according to claim 12 characterized in further comprising a phase error removing unit, for removing a phase error in the phase signal obtained by the unwrapping unit.

14. A digital coherent optical communication receiver, characterized in comprising the apparatus for monitoring statistical characteristics of phase noises according to claim 12.

15. The apparatus for monitoring statistical characteristics of phase noises according to claim 11, characterized in further comprising a phase error removing unit, for removing a phase error in the phase signal obtained by the unwrapping unit.

16. A digital coherent optical communication receiver, characterized in comprising the apparatus for monitoring statistical characteristics of phase noises according to claim 11.

17. The apparatus for monitoring statistical characteristics of phase noises according to claim 1, characterized in further comprising a phase error removing unit, for removing a phase error in the phase signal obtained by the unwrapping unit.

18. The apparatus for monitoring statistical characteristics of phase noises according to claim 17, characterized in that the phase error removing unit removes the phase error by subtracting, from the phase signal obtained by the unwrapping unit, a phase error caused by an frequency offset from an frequency offset estimating means of the digital coherent optical communication receiver.

19. A digital coherent optical communication receiver, characterized in comprising the apparatus for monitoring statistical characteristics of phase noises according to claim 18.

20. A digital coherent optical communication receiver, characterized in comprising the apparatus for monitoring statistical characteristics of phase noises according to claim 17.

21. A digital coherent optical communication receiver, characterized in comprising the apparatus for monitoring statistical characteristics of phase noises according to claim 1.

22. A method for monitoring statistical characteristics of phase noises, comprising:
an argument calculating step, for obtaining an argument of an input signal;
an unwrapping step, for unwrapping the argument obtained in the argument calculating step to obtain a phase signal;
a delaying step, for delaying the phase signal;
a differentiating step, for obtaining a difference between a phase signal currently obtained in the unwrapping step and a phase signal delayed in the delaying step;
a modulus squaring step, for obtaining a square of the modulus of the difference; and
an averaging step, for averaging squares of moduli of a plurality of differences obtained in the modulus squaring step to obtain an MSDP value.

* * * * *